(12) United States Patent
Nagasaku

(10) Patent No.: US 8,813,726 B2
(45) Date of Patent: Aug. 26, 2014

(54) FUEL TANK SYSTEM

(75) Inventor: Yuichi Nagasaku, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 14/003,572

(22) PCT Filed: Mar. 28, 2011

(86) PCT No.: PCT/JP2011/057721
§ 371 (c)(1),
(2), (4) Date: Sep. 6, 2013

(87) PCT Pub. No.: WO2012/131885
PCT Pub. Date: Oct. 4, 2012

(65) Prior Publication Data
US 2014/0007849 A1  Jan. 9, 2014

(51) Int. Cl.
*F02M 33/08* (2006.01)
*F02M 25/08* (2006.01)
*B60K 15/035* (2006.01)
*F02M 33/00* (2006.01)

(52) U.S. Cl.
CPC ........... *F02M 25/0854* (2013.01); *F02M 33/08* (2013.01); *F02M 25/089* (2013.01); *B60K 15/03504* (2013.01); *B60K 15/03519* (2013.01); *B60K 2015/03514* (2013.01); *F02M 25/0836* (2013.01)
USPC ....................................... 123/519

(58) Field of Classification Search
CPC ............ F02M 25/089; F02M 25/0854; F02M 25/0872; F02M 33/08
USPC .......... 123/516, 518, 519, 520, 514; 137/587, 137/588, 589
See application file for complete search history.

(56) References Cited

U.S. PATENT DOCUMENTS

| | | | |
|---|---|---|---|
| 2001/0052292 A1* | 12/2001 | Ito | 96/134 |
| 2010/0252005 A1* | 10/2010 | Kitamoto et al. | 123/518 |
| 2010/0288242 A1 | 11/2010 | Makino et al. | |
| 2010/0294251 A1* | 11/2010 | Makino et al. | 123/519 |
| 2011/0120425 A1* | 5/2011 | Aso et al. | 123/520 |
| 2011/0214646 A1* | 9/2011 | Makino | 123/518 |

FOREIGN PATENT DOCUMENTS

| | | | | |
|---|---|---|---|---|
| JP | 06081726 A | * | 3/1994 | ............ F02M 25/08 |
| JP | A-11-34675 | | 2/1999 | |
| JP | A-2002-122046 | | 4/2002 | |
| JP | A-2003-314381 | | 11/2003 | |

(Continued)

OTHER PUBLICATIONS

Jan. 15, 2013 Notice of Reasons for Rejection issued in Japanese Patent Application No. 2012-510470 (with translation).

(Continued)

*Primary Examiner* — Mahmoud Gimie
(74) *Attorney, Agent, or Firm* — Oliff PLC

(57) ABSTRACT

A fuel tank system capable of purging a canister without relying on the action of negative pressure from the engine, thereby giving excellent energy efficiency. Gases in the fuel tank move to a canister when filling up, and any fuel vapor is adsorbed in the canister. Air components are separated from the gases in the fuel tank using a gas separator and discharged and a negative pressure can be induced inside the fuel tank. This negative pressure acts on the canister and purges the canister.

2 Claims, 10 Drawing Sheets

(56) References Cited

FOREIGN PATENT DOCUMENTS

| | | |
|---|---|---|
| JP | A-2006-177323 | 7/2006 |
| JP | A-2009-191676 | 8/2009 |
| JP | A-2010-248928 | 11/2010 |
| JP | A-2010-265859 | 11/2010 |

OTHER PUBLICATIONS

May 14, 2013 Decision to Grant a Patent issued in Japanese Patent Application No. 2012-510470 (with translation).

* cited by examiner

FUEL TANK SYSTEM

TECHNICAL FIELD

The present invention relates to a fuel tank system.

BACKGROUND ART

In automobile mounted fuel tank systems, in consideration of the fact that engine running times are becoming shorter, for example, in hybrid vehicles, and in order to improve fuel efficiency it is desirable for canisters to be capable of being purged without having to rely on negative pressure from the engine. In Japanese Patent Application Laid-Open No. 2003-314381, a fuel vapor recovery apparatus is described that sucks vapor from a canister with a suction pump, liquefies the fuel vapor in a liquefier, and returns it to the fuel tank.

However, in the structure of JP-A No. 2003-314381, cooling energy is required in order to cool and liquefy the fuel vapor in the liquefier, and further improvements to energy efficiency are required.

DISCLOSURE OF INVENTION

Technical Problem

In consideration of the above circumstances, an object of the present invention is to obtain a fuel tank system capable of purging a canister without relying on the action of negative pressure from the engine, and having excellent energy efficiency.

Solution to Problem

The present invention includes: a fuel tank for holding fuel; a canister capable of adsorbing fuel vapor inside the fuel tank and releasing the fuel vapor; a gas separator that separates air components from gases in the fuel tank and discharges the separated air components externally to the fuel tank; an internal pressure detecting device for detecting internal pressure of the fuel tank; and a switching device for switching between a first state in which the internal pressure of the fuel tank is in a negative pressure state of a negative pressure of a first specific value or lower and it is possible to use the negative pressure to suck fuel vapor that has been adsorbed by the canister into the fuel tank, and a second state in which the internal pressure of the fuel tank is in a positive pressure state of a positive pressure of a second specific value or higher and it is possible to use the positive pressure to cause gas of a gas layer to pass through the gas separator and air components in the gas layer to be externally discharged from the gas separator.

In such a fuel tank system, there is an internal pressure detecting device for detecting internal pressure of the fuel tank, and when the internal pressure of the fuel tank is in a positive pressure state of a positive pressure of the second specific value or higher, the switching device switches to the second state in which it is possible to use the positive pressure to cause the gas of the gas layer to pass through the gas separator and air components in the gas layer to be externally discharged from the gas separator. The amount of air components in the fuel tank is accordingly reduced due to separating air components from the gas in the fuel tank and externally discharging them from the gas separator.

In this state the internal pressure of the fuel tank falls as a result of for example the temperature inside the fuel tank falling. In a state in which the internal pressure of the fuel tank is a negative pressure state of a negative pressure of the first specific value or lower, the switching device switches to the first state in which it is possible to use the negative pressure to suck fuel vapor that has been adsorbed by the canister into the fuel tank. It is therefore possible to release (purge) and suck out the fuel vapor that has been adsorbed in the canister and return it to the fuel tank due to the negative pressure inside the fuel tank acting on the canister.

It is possible to repeatedly perform actions to create negative pressure inside the fuel tank by separating air components in the gas separator and discharging them externally to the fuel tank when a positive pressure state exists in the fuel tank, and to repeatedly perform purging actions on the canister when a negative pressure state exists inside the fuel tank.

In the present invention, energy efficiency is higher than for a configuration in which fuel vapor is cooled by for example a liquefier, since there is no need to cool the fuel vapor by driving the carburetor to purge the canister. The present invention can also contribute to an improvement in vehicle fuel efficiency.

A switching means according to the present invention may be configured to include: a communication pipe with one end connected to the fuel tank, an intermediate section that branches at a branching section, and the other ends respectively connected to the canister and the gas separator; a discharge pipe for externally discharging air components from the gas separator; a three-way valve provided to the branching section of the communication pipe and capable of selectively switching a discharge path for gas from the fuel tank between a canister side communication path that communicates the fuel tank with the canister and a gas separator side communication path that communicates the fuel tank with the gas separator; and an open-shut valve provided at a location on a path from the fuel tank via the gas separator to the discharge pipe.

In such a configuration, it is possible to switch between the first state and the second state by combining an action of the three way valve to switch the discharge path for gas from the fuel tank between either the canister side communication path or the gas separator side communication path, and an action of the open-shut valve to open or close a location on a path from the fuel tank via the gas separator to the discharge pipe. It is also possible to achieve a more simple structure by the canister side communication path and the gas separator side communication path being configured as a common gas discharge path from the fuel tank as far as the branching section (the three-way valve), such that a single three-way valve is sufficient to act as the valve for opening and closing these two pipes.

Advantageous Effects of Invention

Due to the present invention being configured as described above, it is possible to purge a canister without relying on the action of negative pressure from the engine, and excellent energy efficiency is also achieved.

BEST MODE FOR CARRYING OUT THE INVENTION

Figure 1:
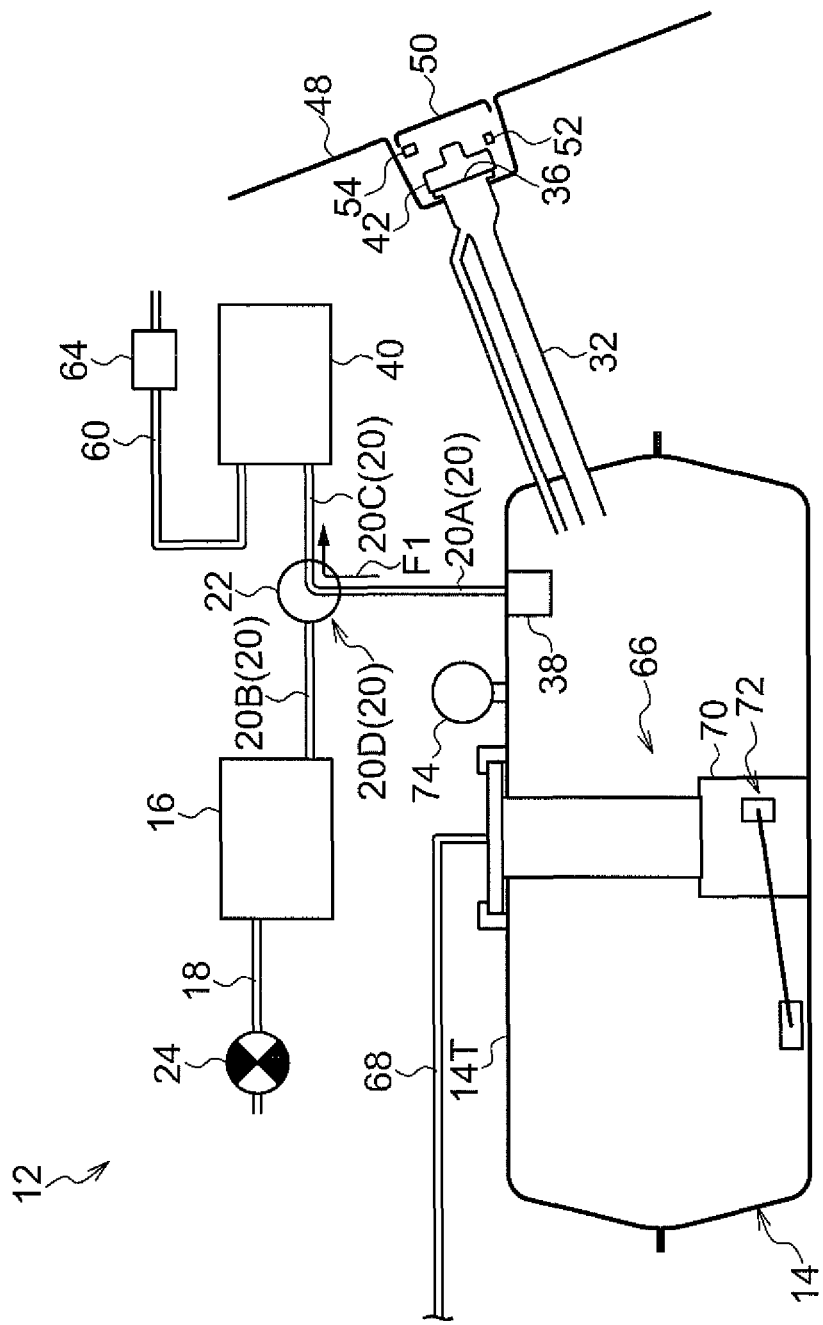
FIG. 1 is a schematic configuration diagram illustrating a fuel filling state of a fuel tank system of a first exemplary embodiment of the present invention.

FIG. 1 illustrates a fuel tank system 12 according to a first exemplary embodiment of the present invention. A fuel tank 14 of the fuel tank system 12 is made from resin in the present exemplary embodiment. The fuel tank 14 is formed overall in a shape capable of holding fuel inside (for example a substantially rectangular box shape).

The fuel tank 14 is supported from below by a tank band(s), not shown in the drawings. Both ends of the tank band(s) are fixed to a floor panel bracket, not shown in the drawings. The fuel tank 14 is thereby mounted to the floor panel in a state supported by the tank band(s).

As shown in FIG. 1, a lower portion of an inlet pipe 32 is connected to the fuel tank 14. The top end of the inlet pipe 32 configures a fuel fill inlet 36. Fuel can be filled by inserting a fuel gun into the fuel fill inlet 36 and the fuel is guided into the fuel tank 14. Some of the fuel may also be housed in the inlet pipe 32, depending on the amount of fuel inside the fuel tank 14.

A valve 38 is provided to a top wall 14T of the fuel tank 14 to regulate the full tank liquid level and to prevent fuel from spilling over. The valve 38 is left open when filling up the fuel tank 14 until fuel in the fuel tank 14 has reached the full tank liquid level. Fuel can be filled continuously since gases inside the fuel tank 14 are discharged to a canister 40, described later. The valve 38 is shut when the fuel in the fuel tank 14 reaches the full tank liquid level, and since vapor inside the fuel tank 14 can no longer be discharged to the canister 40, the fuel being filled rises up inside the inlet pipe 32 and reaches the fuel gun. An auto-stop mechanism on the fuel gun is accordingly actuated, thereby stopping fuel filling.

The fuel fill inlet 36 of the inlet pipe 32 is configured so as to be opened and shut by a fuel cap 42. A fuel lid 50 is also provided in a vehicle side panel 48 further to the outside of the fuel cap 42.

Figure 2:
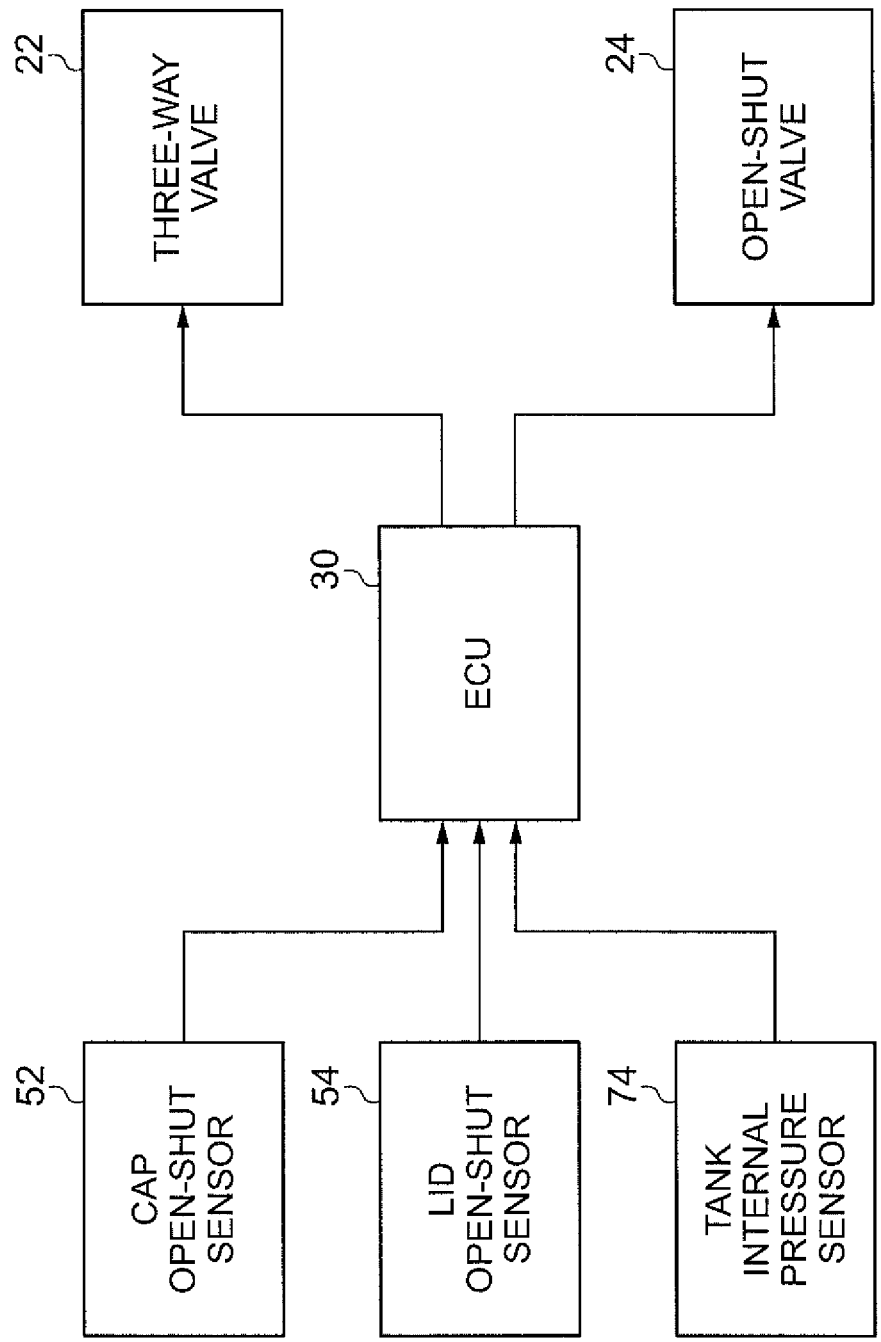
FIG. 2 is a block diagram of a fuel tank system of the first exemplary embodiment of the present invention.

The fuel lid 50 is controlled so as to be locked or unlocked by an ECU 30 (see FIG. 2). The top of the inlet pipe 32 (fuel filling path) is capable of being opened when a fuel lid opener, not shown in the drawings, is operated.

The fuel cap 42 shuts off the top of the inlet pipe 32 when in a mounted state to the fuel fill inlet 36, thereby preventing fuel gun access to the inlet pipe 32. However the top of the inlet pipe 32 is open when the fuel cap 42 has been removed from the fuel fill inlet 36, and access to the inlet pipe 32 is possible.

A cap open-shut sensor 52 is provided in a vehicle for detecting open or shut states of the fuel cap 42 and transmitting data regarding the state to the ECU 30. Similarly, a lid open-shut sensor 54 is provided in a vehicle for detecting open or shut states of the fuel lid 50 and transmitting data regarding the state to the ECU 30.

The canister 40 is disposed above the fuel tank 14. An adsorbent material configured for example from activated carbon is contained in the canister 40. Fuel vapor can be adsorbed in the adsorbent material or released from the adsorbent material.

A gas separator 16 is disposed above the fuel tank 14. The gas separator 16 separates only air components, that is components other than those configuring fuel vapor, from gases (mixed gases including both air components and fuel vapor components) that have been fed from the fuel tank 14, thereby enabling these air components to be discharged from a discharge pipe 18 to the atmosphere (externally discharged from the fuel tank system 12).

One end (the end on a common path 20A side) of a communication pipe 20 is connected to the valve 38 of the fuel tank 14. A branching section 20D is provided partway along the communication pipe 20 such that the communication pipe 20 branches into two paths, these being a canister side communication path 20C and a separator side communication path 20B. The canister side communication path 20C is connected to the canister 40. The separator side communication path 20B is connected to the gas separator 16. The communication pipe 20 configures a discharge path for gases from the fuel tank 14.

A three-way valve 22 is provided to the branching section 20D. As shown in FIG. 2, the three-way valve 22 is controlled by the ECU 30. The ECU 30 selectively switches the path of gases discharged from the fuel tank 14 according to the internal pressure of the fuel tank 14 as detected by a tank internal pressure sensor 74, described later, to either the canister side communication path 20C or the separator side communication path 20B.

An open-shut valve 24 is provided to the discharge pipe 18 of the gas separator 16. As shown in FIG. 2, the open-shut valve 24 is controlled by the ECU 30. The ECU 30 opens the open-shut valve 24 when the internal pressure of the fuel tank 14 as detected by the tank internal pressure sensor 74 exceeds a preset specific threshold value (threshold value P1, described later). The gas flow path linking from the fuel tank 14 through the gas separator 16 to the external atmosphere is accordingly opened to the atmosphere (in external communication), enabling the air components that have been separated in the gas separator 16 to be discharged through the discharge pipe 18. However discharge of the air components to the atmosphere is prevented by shutting the open-shut valve 24.

Either electronic open-shut valves or mechanical open-shut valves may be employed as the three-way valve 22 and the open-shut valve 24, or for example open-shut valves that are both electrical and mechanical may also be employed. Either the three-way valve 22 and/or the open-shut valve 24 may be employed as a safety valve to suppress excessive rise in internal pressure by opening the valve when high pressure arises in the fuel tank 14.

An open-to-atmosphere pipe 60 is also provided to the canister 40. The leading end of the open-to-atmosphere pipe 60 is open to the atmosphere. Hence when the three-way valve 22 communicates the canister side communication path 20C, the gases inside the fuel tank 14 pass through the canister 40 (any fuel vapor is adsorbed by adsorbent agent when this occurs) and are then discharged into the atmosphere. The open-to-atmosphere pipe 60 is an example of the discharge pipe of the present invention. The switching device of the present invention includes the communication pipe 20, the open-to-atmosphere pipe 60, the three-way valve 22 and the open-shut valve 24.

An air filter 64 is provided to the open-to-atmosphere pipe 60 and foreign matter present in the external atmosphere is removed from air introduced into the canister 40. Such foreign matter includes dust and dirt in the air, and also substances such as moisture and mud that would decrease the cross-sectional area of the flow path of the open-to-atmosphere pipe 60.

A fuel pump module 66 is provided in the fuel tank 14 for feeding fuel into the engine. A fuel supply pipe 68 is in communication with the fuel pump module 66 and the engine, and fuel can be fed to the engine by driving a fuel pump 70 configuring the fuel pump module 66. The fuel pump module 66 is also provided with a liquid surface level sensor 72 and so the fuel liquid level inside the fuel tank 14 can be detected. Data regarding the detected liquid level is transmitted to the ECU 30.

The tank internal pressure sensor 74 is provided to the top wall 14T of the fuel tank 14. The tank internal pressure sensor 74 detects the internal pressure of the fuel tank 14. Data regarding the detected internal pressure of the fuel tank 14 is transmitted to the ECU 30.

Explanation next follows regarding operation of the fuel tank system 12 according to the present exemplary embodiment.

In order to fill fuel into the fuel tank 14 the ignition of the vehicle is switched OFF by the driver (or by the fuel filling operator). When an opening operation is performed on the fuel lid 50 in this state by operating a fuel lid opener, the ECU 30 determines that a state (filling up time in the present invention) exists in which fuel is going to be filled into the fuel tank 14. The ECU 30 then controls the three-way valve 22 and places the fuel tank 14 and the canister 40 in communication with each other. Gases inside the fuel tank 14 are accordingly able to move to the canister 40. The ECU 30 also shuts the open-shut valve 24 and so the path for gases out from the gas separator 16 to the external atmosphere is shut off. Removal of the fuel cap 42 from the fuel fill inlet 36 may be employed as trigger for determination as to whether or not the fuel tank 14 filling up time has arrived instead of (or in combination with) operation of the fuel lid opener and accompanying opening operation of the fuel lid 50.

When fuel is being filled in this state, the gases inside the fuel tank 14 are replaced by fuel by the gases in the fuel tank 14 moving into the canister 40 during filling up (see arrow F1 illustrated in FIG. 1). Fuel vapor is contained in the gases in the fuel tank 14, however the fuel vapor in the gases is adsorbed and cleaned by the adsorbent agent in the canister 40. After cleaning the gases are then discharged from the open-to-atmosphere pipe 60 into the atmosphere.

When the fuel liquid level in the fuel tank 14 has reached the valve 38, the fuel in the inlet pipe 32 rises since the gases are no longer discharged from the fuel tank 14. The auto-stop mechanism of the fuel gun is actuated when the fuel in the inlet pipe 32 reaches the fuel gun and filling is stopped.

When filling is complete the fuel cap 42 is installed to the inlet pipe 32, and the fuel lid 50 is also shut. The ECU 30 determines that filling of the fuel tank 14 has been completed when shutting of the fuel lid 50 is detected by the lid open-shut sensor 54 (mounting of the fuel cap 42 may also be detected by the cap open-shut sensor 52, as required).

The ECU 30 controls the three-way valve 22 to switch over to the gas separator 16 side and places the inside of the fuel tank 14 in communication with the gas separator 16 (the gas flow path between the inside of the fuel tank 14 and the canister 40 is shut). The inlet pipe 32 is shut off by the fuel cap 42 and the discharge pipe 18 is also shut by the open-shut valve 24, and so fuel vapor inside the fuel tank 14 is not externally discharged, and a configuration can be achieved with a structure that contains the fuel vapor within the fuel tank 14 (what is referred to as a sealed tank).

Figure 8:
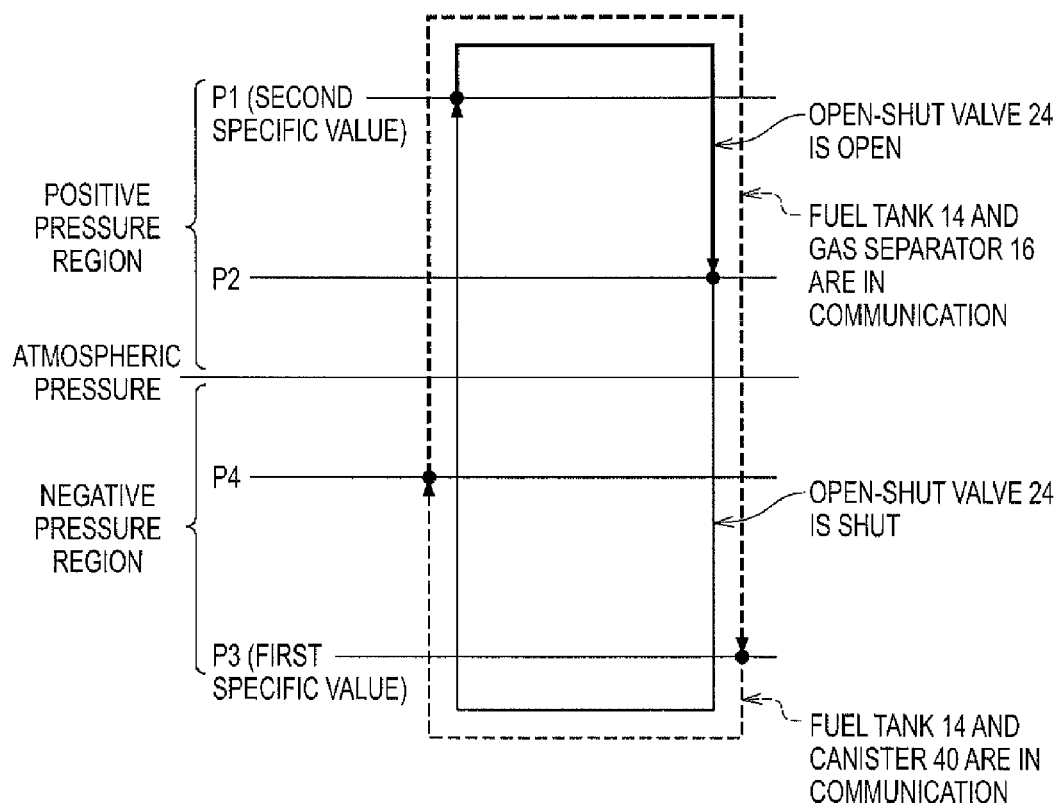
FIG. 8 is a graph explaining a relationship between the internal pressure of a fuel tank and the opening and shutting of an open-shut valve, and the switching of a three-way valve in a fuel tank system of the first exemplary embodiment and the first modified example of the present invention.

Fluctuations in the internal pressure of the fuel tank 14 also occur at other times than at filling up time, such as caused by fluctuations in the surrounding temperature. The ECU 30 controls the three-way valve 22 and the open-shut valve 24 according to the internal pressure of the fuel tank 14 as set out below. Note that in order to control the three-way valve 22 and the open-shut valve 24, as shown in FIG. 8, when the internal pressure of the fuel tank 14 is a positive pressure, a specific threshold value P1 that is higher than atmospheric pressure and a threshold value P2, lower than the threshold value P1 that is higher than the atmospheric pressure, are set (in such cases the relationship atmospheric pressure<P2<P1 holds). The threshold value P1 corresponds to the "second specific value" of the present invention.

Similarly, when the internal pressure of the fuel tank 14 is a negative pressure, a specific threshold value P3 that is lower than atmospheric pressure and a threshold value P4, higher than the threshold value P3 that is lower than the atmospheric pressure, are set (in such cases the relationship P3<P4<atmospheric pressure holds). The threshold value P3 corresponds to the "first specific value" of the present invention. In FIG. 8 the solid lines indicate changes in the state (open or shut) of the open-shut valve 24 according to the internal pressure of the fuel tank 14. Similarly the intermittent lines indicate the changes in the state of the three-way valve 22 (which out of the gas separator 16 or the canister 40 is in communication with the fuel tank 14) according to the internal pressure of the fuel tank 14.

When the temperature inside the fuel tank 14 rises the internal pressure of the fuel tank 14 also rises. In a state in which the internal pressure of the fuel tank 14 is a positive pressure, namely when higher than the atmospheric pressure, the ECU 30 switches the three-way valve 22 to the gas separator 16 side, such that gases in the fuel tank 14 do not flow into the canister 40. The ECU 30 keeps the open-shut valve 24 shut until the internal pressure of the fuel tank 14 is the above threshold value P1 or greater.

Figure 3:
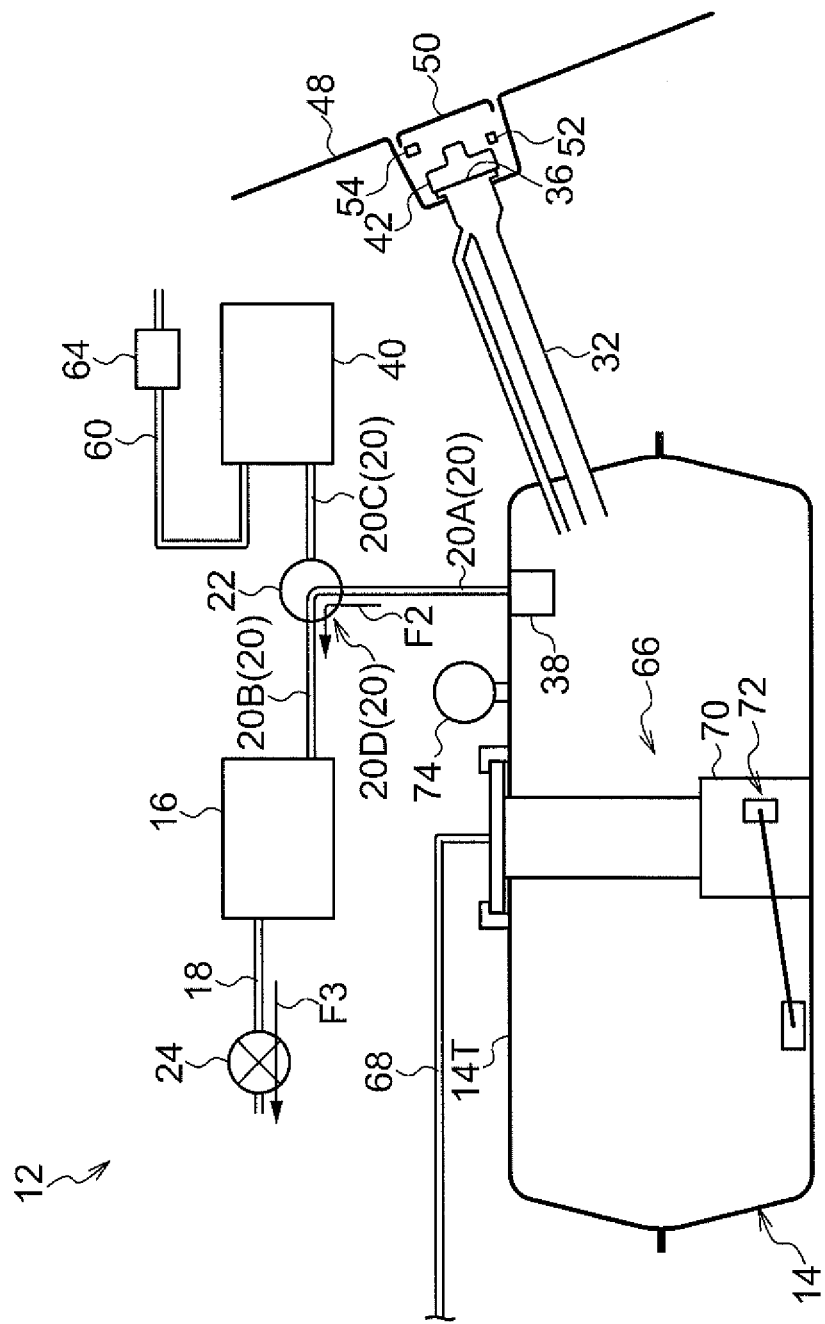
FIG. 3 is a schematic configuration diagram illustrating a state of a fuel tank system of the first exemplary embodiment of the present invention when discharging air components.

When the internal pressure of the fuel tank 14 has reached threshold value P1 (the second specific value) the ECU 30 opens the open-shut valve 24, as shown in FIG. 3. The fuel tank system 12 thereby transitions to a second state. The gases in the fuel tank 14 flow into the gas separator 16 (see arrow F2 in FIG. 3), and gas including the air components that have been separated by the gas separator 16 (not including fuel vapor components) is externally discharged from the fuel tank system 12 (see arrow F3 in FIG. 3). In practice the internal pressure of the fuel tank 14 then falls, since the amount of gas forming the gas layer at the upper portion inside the fuel tank 14 decreases.

The ECU 30 maintains the open state of the open-shut valve 24 until the internal pressure of the fuel tank 14 has fallen and reached the threshold value P2. The gas including the air components present in the fuel tank 14 hence continue to be externally discharged from the fuel tank system 12. The ECU 30 then shuts the open-shut valve 24 when the internal pressure of the fuel tank 14 has fallen to the threshold value P2 or lower.

Hence a reduction in internal pressure of the fuel tank 14 can be achieved since the air components present in the gases in the fuel tank 14 are externally discharged from the fuel tank system 12 when the internal pressure of the fuel tank 14 is a positive pressure.

When the temperature inside the fuel tank 14 falls in such a state, since there is now less of the gases in the fuel tank 14 (the air components), the internal pressure of the fuel tank 14 falls further, resulting in a negative pressure.

Figure 4:
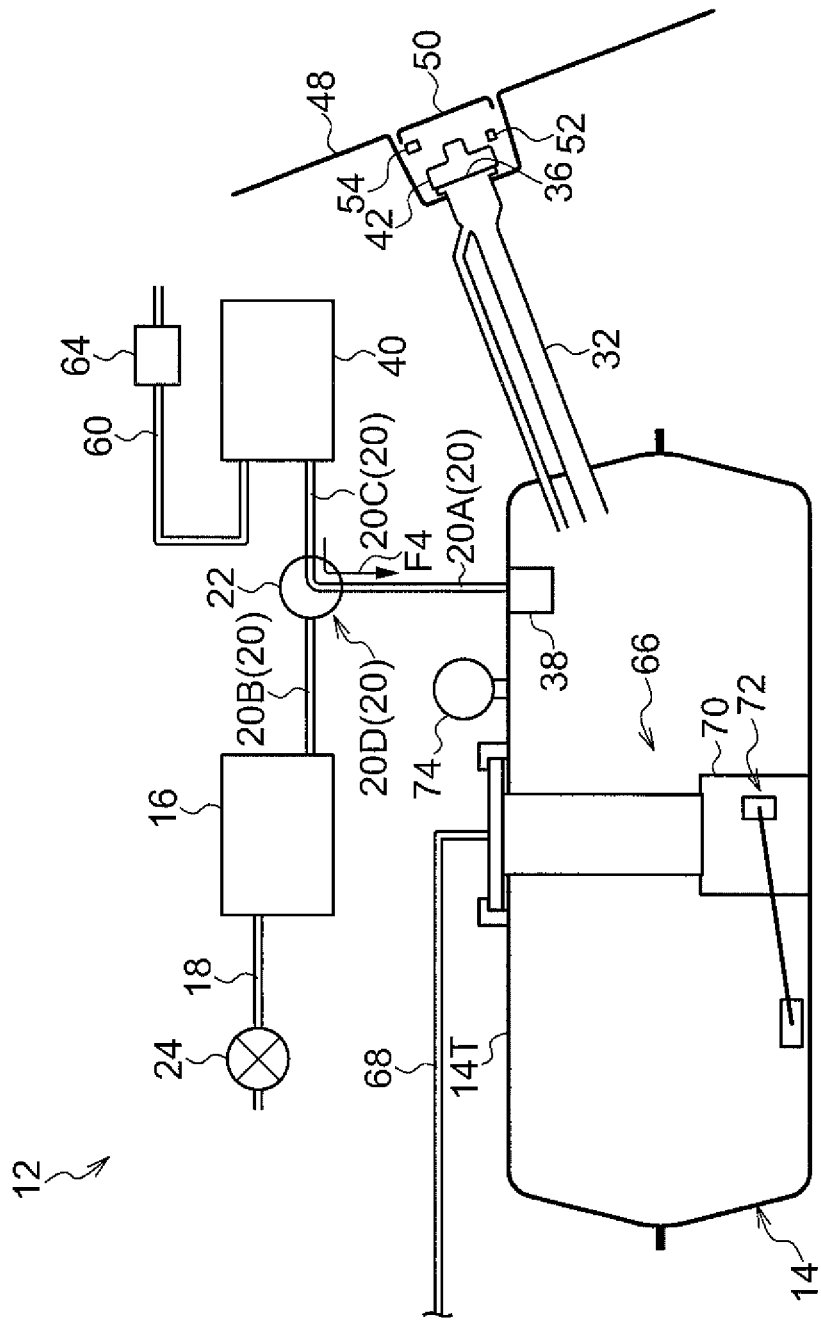
FIG. 4 is a schematic configuration diagram illustrating a state of a fuel tank system of the first exemplary embodiment of the present invention when purging a canister.

When the internal pressure of the fuel tank 14 has become equal to or less than threshold value P3 (the first specific value) referred to above, the ECU 30, as shown in FIG. 4, controls the three-way valve 22 to switch over to the canister 40 side, and places the inside of the fuel tank 14 in communication with the canister 40. The fuel tank system 12 thereby transitions to a first state. Due to the internal pressure of the fuel tank 14 having become a negative pressure this negative pressure acts on the canister 40. In the canister 40 the fuel vapor that was adsorbed when filling up is adsorbed to the adsorbent agent, and this fuel vapor is now released from the adsorbent agent and moves into the fuel tank 14 (sec arrow F4 of FIG. 4). Namely the canister 40 is purged by the negative pressure of the fuel tank 14. Air is introduced into the canister 40 through the open-to-atmosphere pipe 60 during purging the canister 40.

The ECU 30 switches over the three-way valve 22 to the gas separator 16 side when the internal pressure of the fuel tank 14 rises and reaches the threshold value P4, such that gases in the fuel tank 14 do not flow towards the canister 40.

As will be clear from the explanation above, in the fuel tank system 12 of the present exemplary embodiment, when there is a positive pressure in the fuel tank 14, the number of molecules of gas inside the fuel tank 14 is substantially reduced due to externally discharging the air components present in the fuel tank 14. A negative pressure is generated within the fuel tank 14, and by employing this negative pressure to act on the canister 40 and to purge the canister 40, the canister 40 can be purged without relying on the action of negative pressure from the engine. Consequently, superior energy efficiency is achieved and fuel efficiency is raised since the engine does not need to be run in order to purge the canister 40 (or because the engine revs do not need to be increased).

In particular, in the present exemplary embodiment, the amount of air that can be introduced into the fuel tank 14, namely from outside the fuel tank system 12, during the negative pressure duration of the fuel tank 14 is large in comparison to a configuration that does not reduce the air components in the fuel tank 14. The ability to purge the canister 40 is raised by introducing a larger amount of air.

Moreover, although air is introduced into the fuel tank 14 during purging the canister 40, the air components are separated from the fuel vapor components with the gas separator 16 and externally discharged when the internal pressure of the fuel tank 14 has reached the threshold value P1. By thus reducing the amount of air components inside the fuel tank 14 a negative pressure state re-occurs more readily inside the fuel tank 14. It is accordingly possible to repeatedly release fuel vapor from the canister 40 and purge the canister 40 when the negative pressure state inside the fuel tank 14 has re-occurred.

In principle it is possible to employ a state in which the internal pressure of the fuel tank 14 has risen from a negative pressure to atmospheric pressure as the condition for the internal pressure of the fuel tank 14 to trigger opening of the open-shut valve 24. In such cases, in the graph of FIG. 8, effectively P1=atmospheric pressure. Similarly, in principle it is possible to employ a state in which the internal pressure of the fuel tank 14 has fallen from a positive pressure to atmospheric pressure as the condition for the internal pressure of the fuel tank 14 to trigger switching over the three-way valve 22 from the gas separator 16 side to the canister 40 side. In such cases, in the graph of FIG. 8, effectively P2=atmospheric pressure.

However, in practice, atmospheric pressure fluctuates due to factors such as the surrounding temperature and elevation (height above sea level). Consequently, by setting threshold value P1 higher than the highest anticipated atmospheric pressure, even when in a high atmospheric pressure state, for example, the open-shut valve 24 can be opened in a state in which the internal pressure of the fuel tank 14 is certain to be higher than the prevailing atmospheric pressure. Furthermore, by setting threshold value P2 lower than the lowest anticipated atmospheric pressure, even when in a low atmospheric pressure state, for example, the three-way valve 22 can be switched over from the gas separator 16 side to the fuel tank 14 side in a state in which the internal pressure of the fuel tank 14 is certain to be lower than the prevailing atmospheric pressure.

It is possible to employ a timing at which the internal pressure of the fuel tank 14 has fallen from a state of higher than the threshold value P1 to a state at threshold value P1 as the condition for the internal pressure of the fuel tank 14 to trigger shutting the open-shut valve 24. In such cases effectively P2=P1.

However, the internal pressure of the fuel tank 14 falls when the open-shut valve 24 is in an open state. Hence when P2=P1, the internal pressure of the fuel tank 14 falls to lower than the threshold value P1 a short time after opening the open-shut valve 24, and the open-shut valve 24 is then shut. In contrast, by setting the threshold value P2 lower than the threshold value P1, as in the present exemplary embodiment, such that the open-shut valve 24 is only shut when the internal pressure of the fuel tank 14 has fallen to threshold value P2, the open-shut valve 24 is maintained in an open state for a longer duration, and a longer duration can be secured to separate the air components with the gas separator 16.

Similarly, it is possible to employ the timing when the internal pressure of the fuel tank 14 has risen from a state of less than threshold value P2 to a state at threshold value P2 as the condition of internal pressure of the fuel tank 14 to trigger switching over the three-way valve 22 from the canister 40 side to the gas separator 16 side. In such cases effectively P4=P3.

However, in the state in which the three-way valve 22 is switched to the canister 40 side the internal pressure of the fuel tank 14 rises. Hence when P4=P3 the internal pressure of the fuel tank 14 rises to the threshold value P3 a short time after the three-way valve 22 has been switched over to the canister 40 side, and the three-way valve 22 is then switched back to the gas separator 16 side. In contrast thereto, when threshold value P4 is set higher than threshold value P3, the three-way valve 22 only switches over from the canister 40 side to the gas separator 16 side when the internal pressure of the fuel tank 14 has risen to threshold value P4, and so a state of communication between the fuel tank 14 and the canister 40 is maintained for a longer duration, enabling a longer duration to be secured for purging the canister 40.

Figure 5:
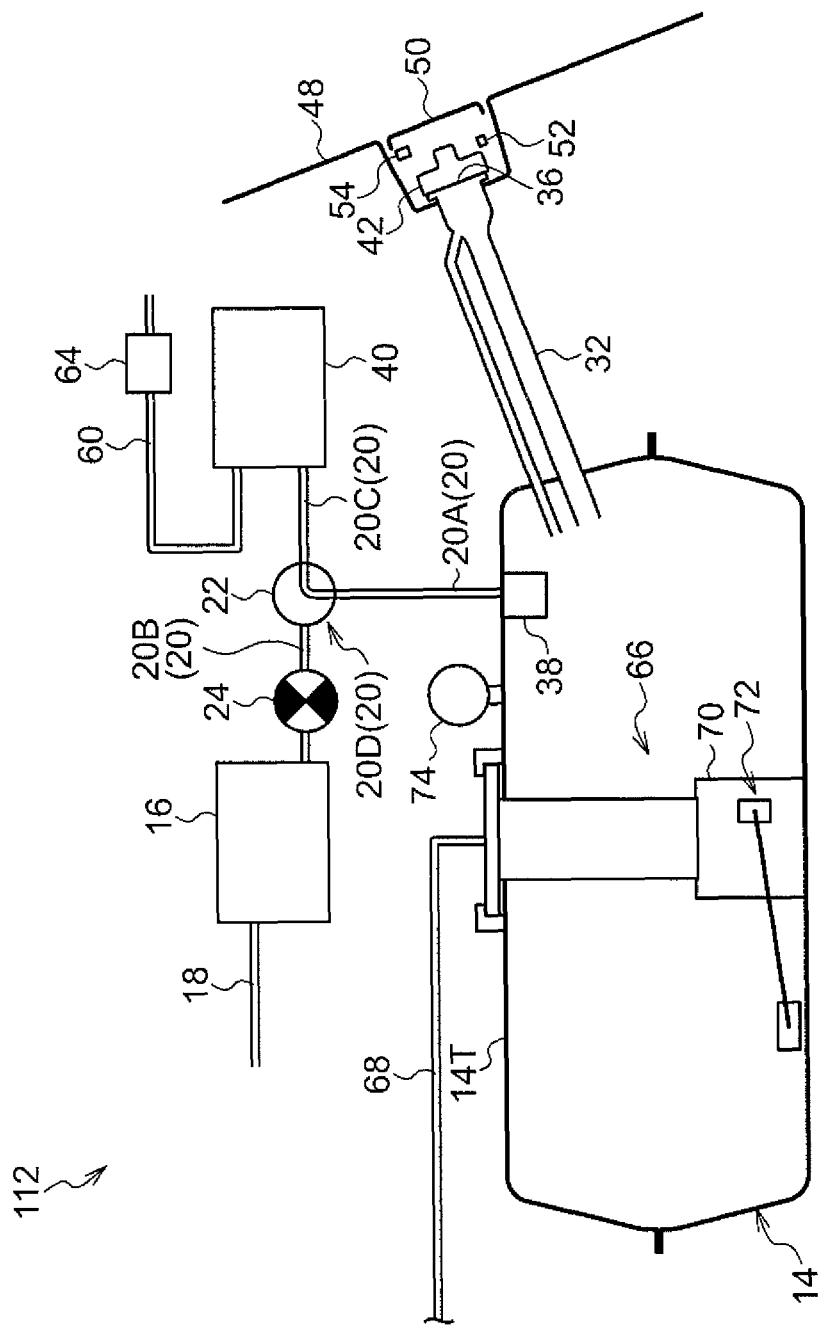
FIG. 5 is a schematic configuration diagram illustrating a first modified example of a fuel tank system of the first exemplary embodiment of the present invention.

Note that while an example has been given above in which the open-shut valve 24 is provided to the discharge pipe 18, the position of the open-shut valve 24 is not limited thereto. Configuration may be made with the open-shut valve 24 provided anywhere along a pipe (the "separation pipe" of the present invention) from the fuel tank 14 to the discharge pipe 18 via the common path 20A and the separator side communication path 20B. For example, as in a fuel tank system 112 of a first modified example illustrated in FIG. 5, the open-shut valve 24 may be provided on the separator side communication path 20B from the branching section 20D to the gas separator 16. Similar open-shut control may be performed on the open-shut valve 24 in the first modified example configuration to that performed in the fuel tank system 12 illustrated in FIG. 1 to FIG. 4.

Figure 6:
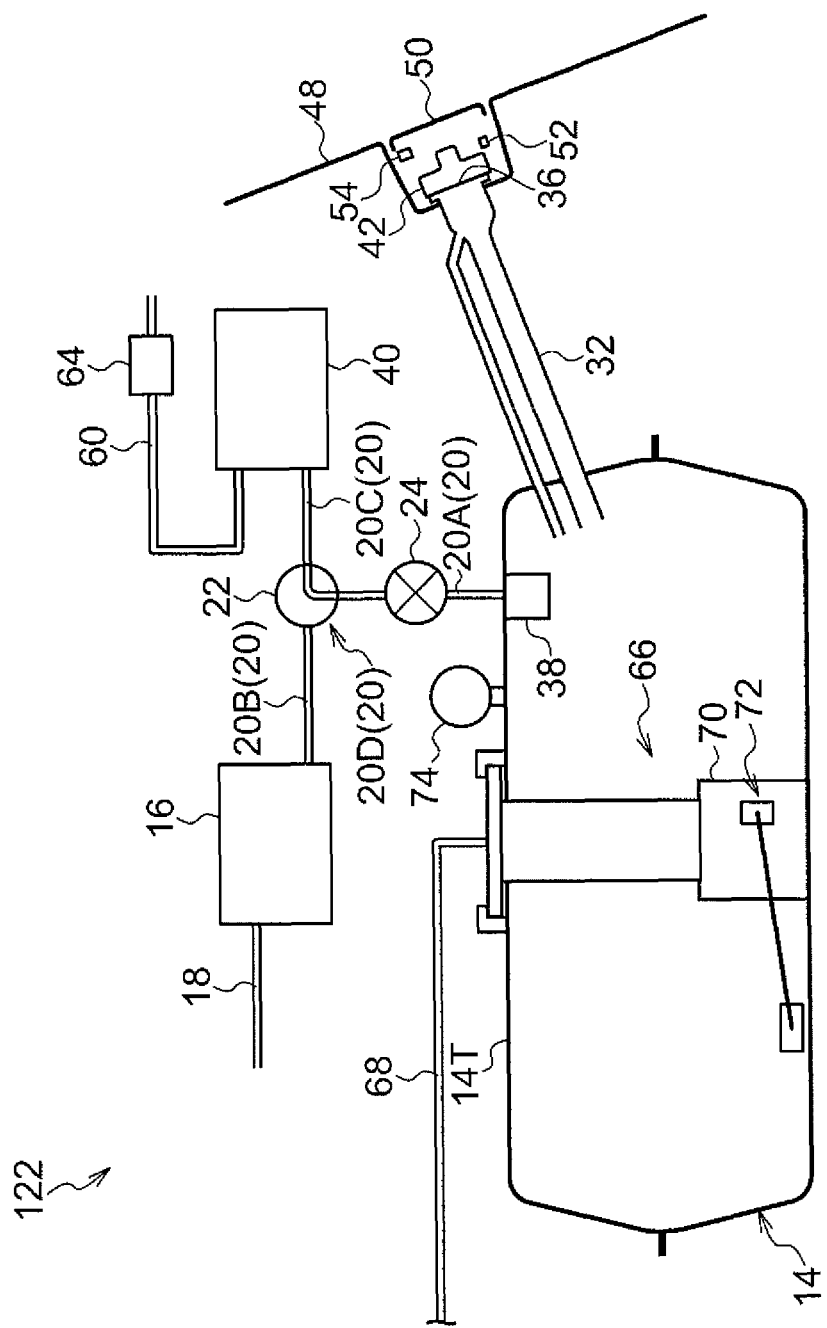
FIG. 6 is a schematic configuration diagram illustrating a second modified example of a fuel tank system of the first exemplary embodiment of the present invention.
Figure 9A:
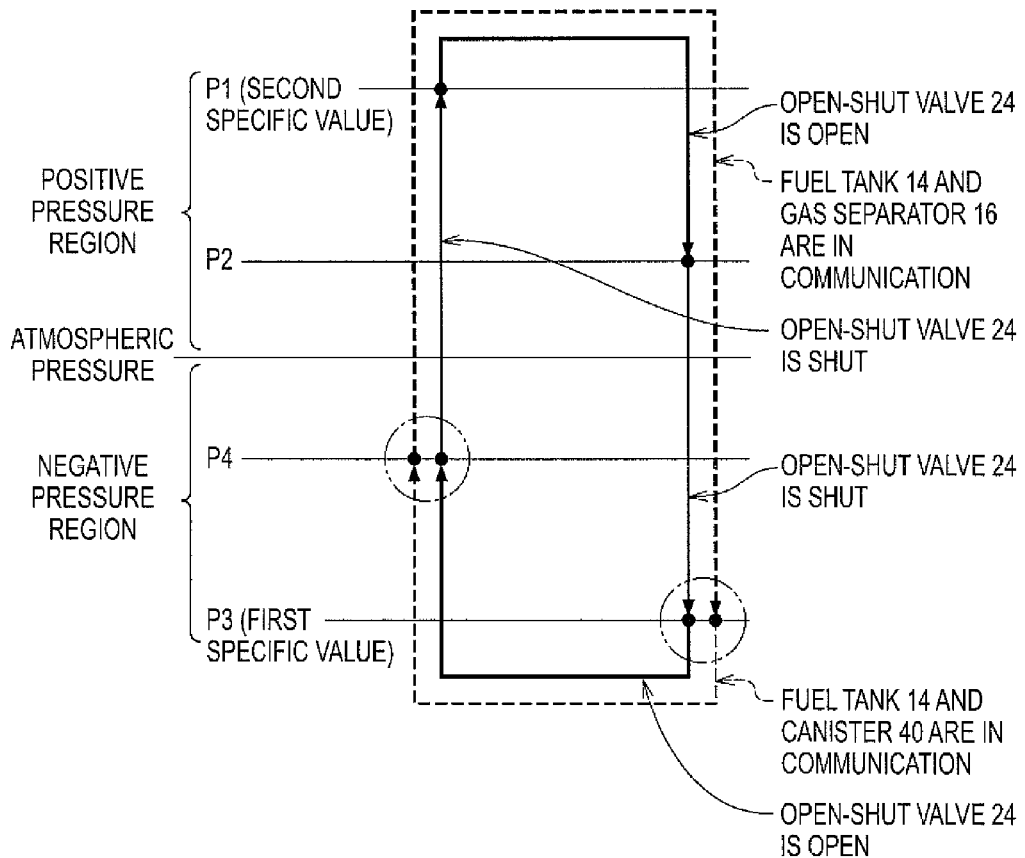
FIG. 9A is a graph explaining a relationship between the internal pressure of a fuel tank and the opening and shutting of an open-shut valve, and the switching of a three-way valve in a fuel tank system of the second modified example of the first exemplary embodiment of the present invention.

The open-shut valve 24 may also be provided to the common path 20A from the valve 38 to the branching section 20D, as in a fuel tank system 122 of a second modified example illustrated in FIG. 6. The fuel tank system 122 can be applied with the changes of states illustrated in FIG. 9A in place of the changes of states of the open-shut valve 24 and the three-way valve 22 illustrated in FIG. 8.

Namely when the temperature inside the fuel tank 14 rises and the internal pressure of the fuel tank 14 becomes high, the ECU 30 switches over the three-way valve 22 to the gas separator 16 side and shuts the open-shut valve 24 at least prior to the internal pressure of the fuel tank 14 reaching threshold value P1 (the second specific value).

The ECU 30 opens the open-shut valve 24 when the internal pressure of the fuel tank 14 becomes threshold value P1 or greater. The fuel tank system 122 thereby transitions to the second state. The gases in the fuel tank 14 thereby flow into the gas separator 16, and the internal pressure of the fuel tank 14 falls due to the separated gas (the air components) being externally discharged from the fuel tank system 12.

Due to the ECU 30 maintaining the open state of the open-shut valve 24 until the internal pressure of the fuel tank 14 has fallen and reached the threshold value P2, the gases (air components) in the fuel tank 14 hence continue to be externally discharged from the fuel tank system 12. The ECU 30 then shuts the open-shut valve 24 when the internal pressure of the fuel tank 14 has fallen to the threshold value P2 or lower. The changes of state of the open-shut valve 24 and the three-way valve 22 up to this point are substantially the same as those illustrated in FIG. 8.

In this state the internal pressure of the fuel tank 14 falls further due to the temperature falling within the fuel tank 14, and a negative pressure arises. The ECU 30 then switches over the three-way valve 22 to the canister 40 side and opens the open-shut valve 24 when the internal pressure of the fuel tank 14 has become threshold value P3 (the first specific value) or lower, such that the inside of the fuel tank 14 is in communication with the canister 40. The fuel tank system 122 thereby transitions to the first state.

Figure 9B:
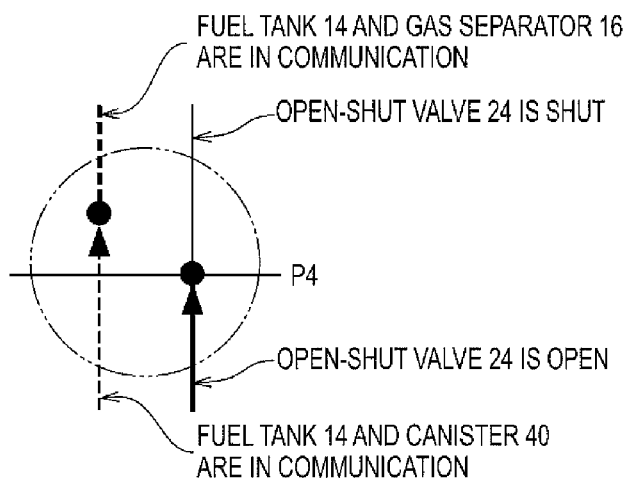
FIG. 9B is an explanatory diagram illustrating the relationship between the internal pressure of the fuel tank and the opening and shutting of the open-shut valve, and the switching of the three-way valve at states before and after reaching P4 in the second modified example of the first exemplary embodiment of the present invention.
Figure 9C:
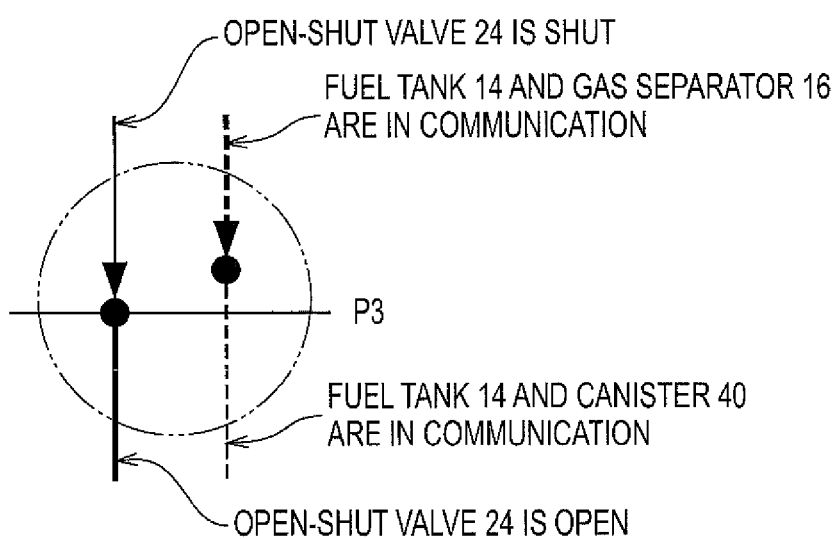
FIG. 9C is an explanatory diagram illustrating a relationship between the internal pressure of the fuel tank and the opening and shutting of an open-shut valve and the switching of a three-way valve at states before and after reaching P3 in the fuel tank system of the second modified example of the first exemplary embodiment of the present invention.

Due to negative pressure inside the fuel tank 14 acting on the canister 40, the fuel vapor that has been adsorbed by the adsorbent agent of the canister 40 is released from the adsorbent agent and moves into the fuel tank 14 (the canister 40 is purged by the negative pressure of the fuel tank 14). Note that, as shown in FIG. 9C, configuration may be made such that the three-way valve 22 is switched over to the canister 40 side (with the open-shut valve 24 maintained in a shut state) at a stage prior to the internal pressure of the fuel tank 14 reaching threshold value P3, and then the open-shut valve 24 opened when the internal pressure of the fuel tank 14 is a state in which threshold value P3 has been reached.

The ECU 30 shuts the open-shut valve 24 and also switches over the three-way valve 22 to the gas separator 16 side when the internal pressure of the fuel tank 14 has risen and reached threshold value P4. The gases in the fuel tank 14 are hence prevented from flowing into the canister 40. Note that, as shown in FIG. 9B, configuration may also be made such that the open-shut valve 24 is first shut when the internal pressure of the fuel tank 14 has risen to reach threshold value P4, such that the gases in the fuel tank 14 are prevented from flowing into the canister 40, and then the three-way valve 22 is switched over to the gas separator 16 side at a stage when the internal pressure of the fuel tank 14 has risen further than threshold value P4.

The open-shut valve 24 may be dispensed with if the three-way valve 22 is configured so as to be able to close off both the separator side communication path 20B and the canister side communication path 20C. In such cases the three-way valve 22 effectively also serves as the open-shut valve 24.

In the above an example is given of the fuel tank system 12 with a structure including the communication pipe 20 that has one end connected to the inside of the fuel tank 14 (the valve 38) and other ends connected to the canister 40 and the gas separator 16 through the branching section 20D. Such a communication pipe 20 reduces the number of components since some portions of the pipe between the fuel tank 14 and the canister 40 are common to portions of the pipe between the fuel tank 14 and the gas separator 16. However obviously separate provision may be made of the pipe between the fuel tank 14 and the canister 40 and the pipe between the fuel tank 14 and the gas separator 16. In such cases an open-shut valve controlled by the ECU 30 may be provided on each of the pipes.

In whichever configuration is adopted there is no need for the negative pressure of the engine to be employed to act on the canister 40 in order to purge the canister 40. For example, while shorter engine running times are anticipated for hybrid vehicles and the like, fuel vapor can be more reliably released (purged) from the canister 40 even in such a vehicle with shorter engine running time.

When fuel vapor is released from the canister 40 by the negative pressure of the engine, due to the fuel vapor released from the canister 40 being employed directly as fuel for the engine there is a concern that a change in the air-to-fuel ratio (the ratio of air to fuel) might arise. However in the above exemplary embodiments the air-to-fuel ratio does not change since the fuel vapor that has been released in the canister 40 is not directly employed as fuel in the engine.

Figure 7:
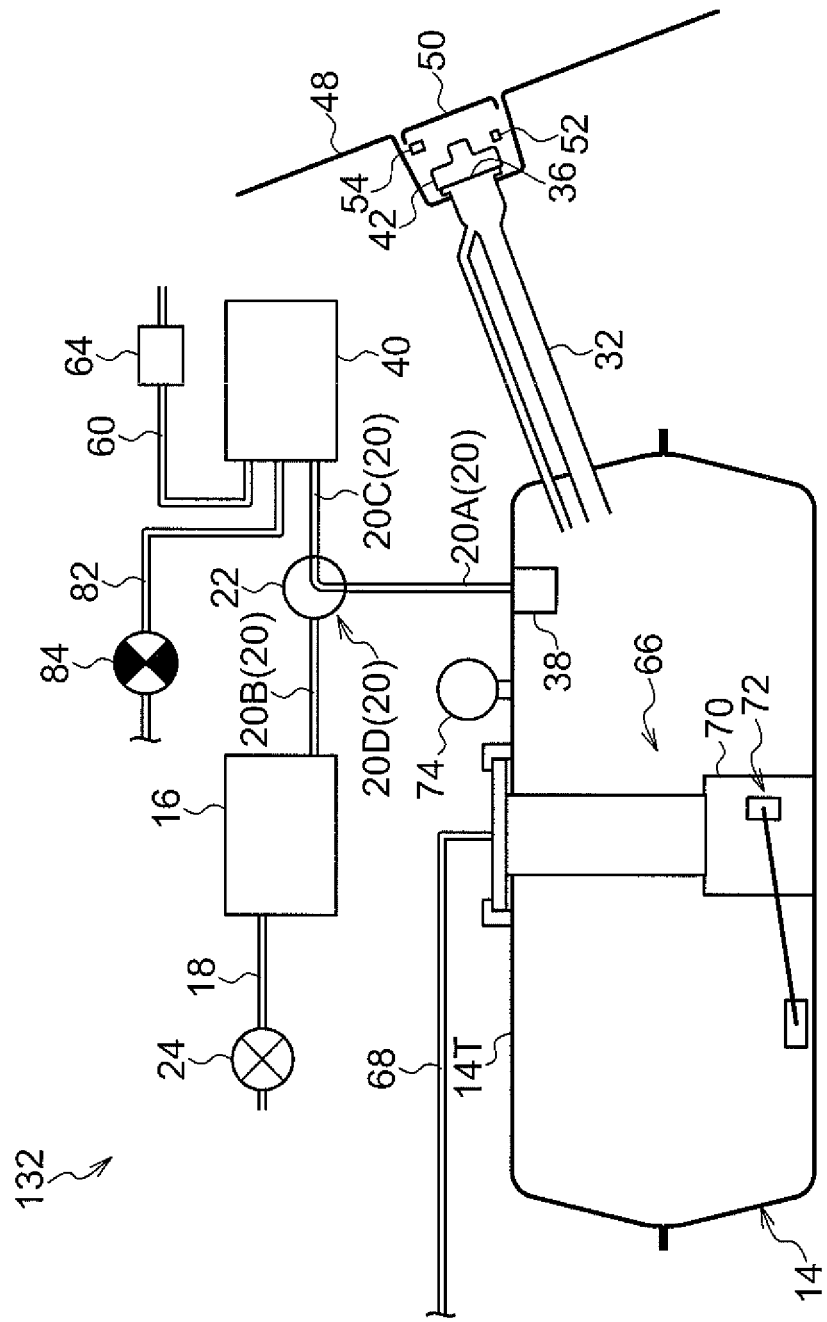
FIG. 7 is a schematic configuration diagram illustrating a third modified example of a fuel tank system of the first exemplary embodiment of the present invention.

Obviously the present invention does not exclude a configuration of fuel tank system in which negative pressure of the engine is used in combination to perform release (purging) of the fuel vapor from the canister 40. Namely, a configuration may be adopted such as that of a fuel tank system 132 of a third modified example, as shown in FIG. 7, in which a negative pressure pipe 82 on which negative pressure of the engine acts is connected to the canister 40, and an open-shut valve 84 is provided to the negative pressure pipe. In such a configuration, for example, the open-shut valve 84 may be opened such that the negative pressure of the engine acts on the canister 40 in cases such as when the negative pressure of the fuel tank 14 is insufficient, or cases such as when more certain purging is required.

The invention claimed is:

1. A fuel tank system comprising:
   a fuel tank for holding fuel;
   a canister capable of adsorbing fuel vapor inside the fuel tank and releasing the fuel vapor;
   a gas separator that separates air components from gases in the fuel tank and discharges the separated air components externally to the fuel tank;
   an internal pressure detecting device for detecting internal pressure of the fuel tank; and
   an electronic control unit configured to control a switching device to switch between a first state in which the internal pressure of the fuel tank is in a negative pressure state of a negative pressure of a first specific value or lower and in which first state fuel vapor that has been adsorbed by the canister is suctioned into the fuel tank by the negative pressure, and a second state in which the internal pressure of the fuel tank is in a positive pressure state of a positive pressure of a second specific value or higher and in which second state gas of a gas layer is caused to pass through the gas separator and air components in the gas layer are caused to be externally discharged from the gas separator by the positive pressure, at a time of not supplying fuel to the fuel tank.

2. The fuel tank system of claim 1 wherein the switching device comprises:
   a communication pipe with one end connected to the fuel tank, an intermediate section that branches at a branching section, and the other ends respectively connected to the canister and the gas separator;
   a discharge pipe for externally discharging air components from the gas separator;
   a three-way valve provided to the branching section of the communication pipe and capable of selectively switching a discharge path for gas from the fuel tank between a canister side communication path that communicates the fuel tank with the canister and a gas separator side communication path that communicates the fuel tank with the gas separator; and
   an open-shut valve provided at a location on a path from the fuel tank via the gas separator to the discharge pipe.

* * * * *